United States Patent [19]

Buehrig et al.

[11] 4,411,462
[45] Oct. 25, 1983

[54] AUTOMOBILE FRONT END CONSTRUCTION INCORPORATING AN AIR-BAG

[75] Inventors: Gordon M. Buehrig; Kathryn L. Buehrig, both of Grosse Pointe Woods, Mich.

[73] Assignee: Richard P. Kughn, Detroit, Mich.

[21] Appl. No.: 344,738

[22] Filed: Feb. 1, 1982

[51] Int. Cl.³ .............................................. B60R 19/10
[52] U.S. Cl. .................................... 293/132; 293/134; 296/189; 296/194
[58] Field of Search ............... 293/132, 134, 1, 107, 293/115, 120, 4, 102; 180/274; 296/194, 187, 185, 188, 189, 35.2, 193, 196, 197, 203 (U.S. only); 280/770, 784, 730, 734, 743 (U.S. only), 748 (U.S. only)

[56] References Cited

U.S. PATENT DOCUMENTS 3,656,791  4/1972  Truesdell ........................... 293/107
4,176,858 12/1979  Kornhauser ....................... 293/107

FOREIGN PATENT DOCUMENTS 2100817  7/1972  Fed. Rep. of Germany ...... 296/185

Primary Examiner—Robert R. Song
Assistant Examiner—Dennis Pedder
Attorney, Agent, or Firm—Harness, Dickey & Pierce

[57] ABSTRACT

A front end construction for an automobile body having an essentially rigid, forward mounting structure, the front end construction including a bumper yieldably mounted on a fixed, lightweight, crushable and collapsible supporting frame disposed ahead of the engine compartment of the vehicle and containing a normally folded air-bag, the bumper being adapted to absorb relatively light rearwardly directed impact forces without effect on the supporting frame or the air-bag, the supporting frame being adapted to crush under relatively heavier impact forces sufficient to overwhelm the impact resistance capability of the bumper, and the air-bag adapted to explode under the heavier impact forces referred to which are greater than that required to at least initiate crushing of the supporting frame but less than that required to completely collapse it.

20 Claims, 2 Drawing Figures

AUTOMOBILE FRONT END CONSTRUCTION INCORPORATING AN AIR-BAG

BACKGROUND OF THE INVENTION

The automotive industry is currently endeavoring to produce lightweight cars that are sufficiently strong to provide adequate protection for occupants in the event of a collision and at the same time are sufficiently light in weight to maximize fuel economy; however, these objectives are inconsistent to some extent since the elimination of body weight usually makes the vehicle less able to withstand collision forces and to pass industry codes and government vehicle safety regulations. Under current codes and regulations, automotive vehicles are expected to withstand a 30 mph smash into a concrete barrier but some automobile manufacturers have been testing cars at 35 mph. Manifestly, practical solutions to these seemingly inconsistent objectives of fuel economy and adequate passenger protection require novel and innovative concepts on the part of automobile designers.

SUMMARY OF THE INVENTION

The present invention provides a novel design for automotive vehicles that provides protection for occupants of the vehicle in the event of a collision without the need for heavy structural frame members to help sustain impact forces resulting from the collision. The problem is particularly critical in the case of head-on collisions since any collision involving the front end of the vehicle exposes the occupants to maximum danger and also makes the engine and steering mechanisms of the vehicle vulnerable to damage that is difficult and expensive to repair. Accordingly, the novel structure of the present invention is here shown incorporated in the front end of the vehicle where it has maximum utility.

DESCRIPTION OF THE PREFERRED EMBODIMENT

Figure 1:
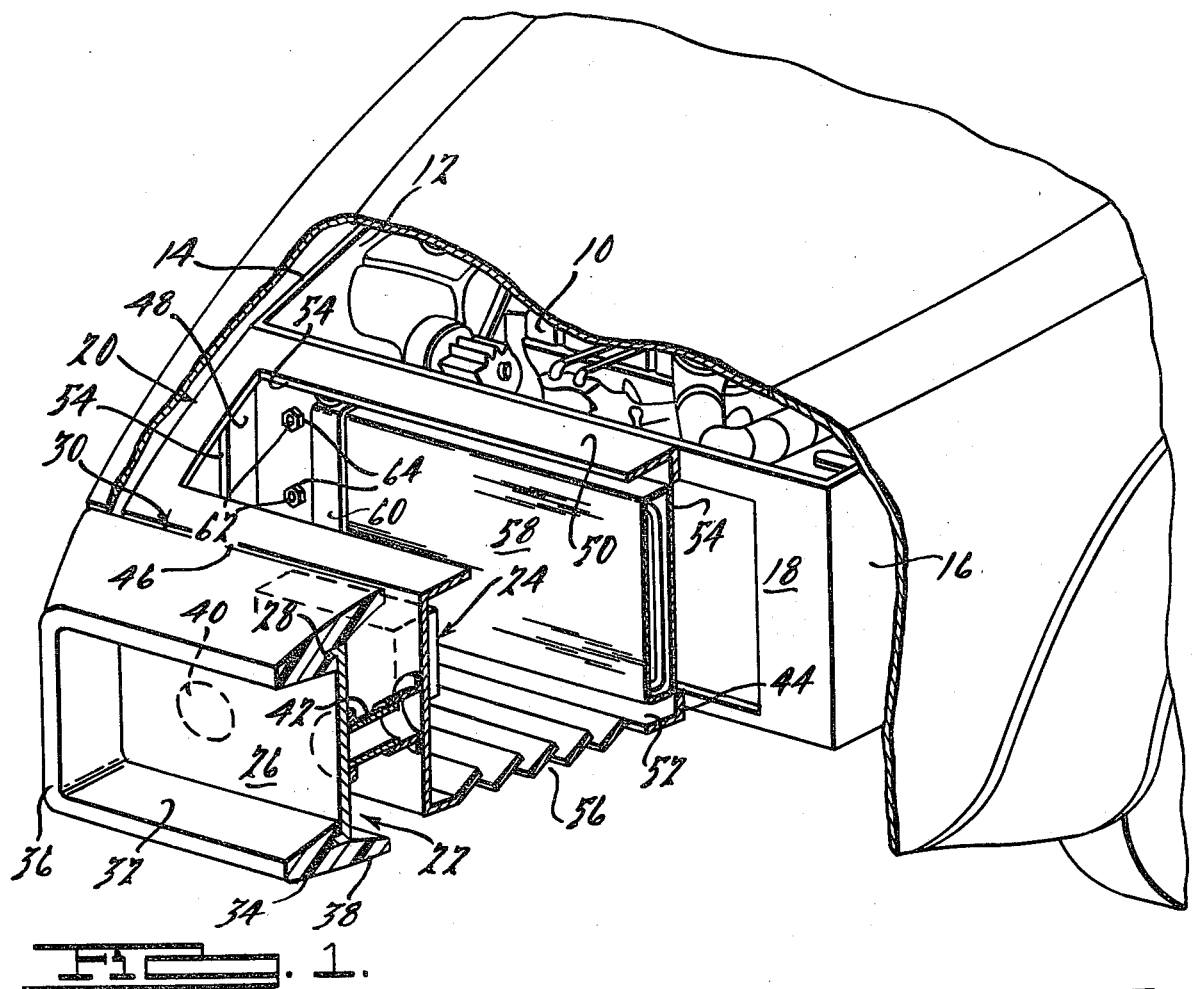
FIG. 1 is a perspective view showing the front end portion of an automotive vehicle incorporating the novel design and construction of this invention, parts of the vehicle being shown in elevation and parts in section for clearness of illustration.
Figure 2:
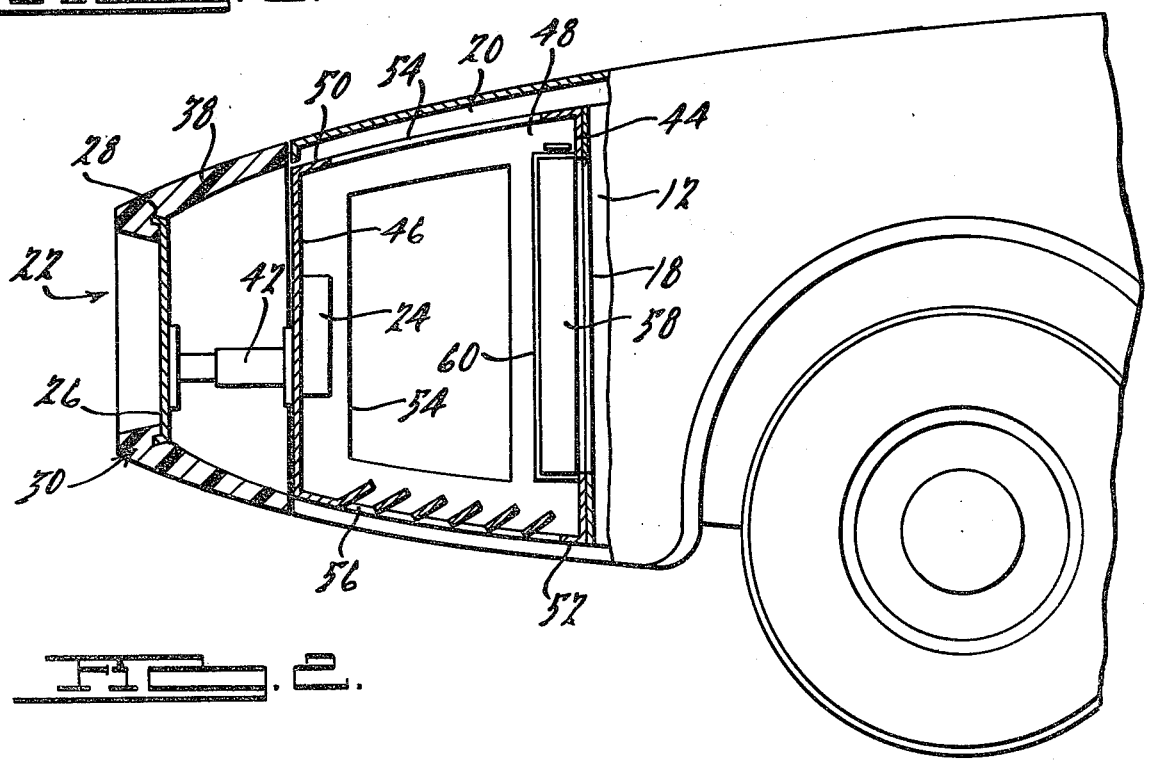
FIG. 2 is a side elevational view of the vehicle showing the forward portion of the vehicle body in longitudinal section in order to better illustrate the novel structure and arrangement of the parts of this invention.

The automotive vehicle here shown by way of illustration is a conventional type in which the engine shown generally at 10 is mounted in an engine compartment 12 having a formed metal floor pan (not shown), front quarter inner panels designated generally by the numerals 14 and 16, and a front transverse mounting structure or bulkhead 18. For the purpose of this invention, the bulkhead 18 and everything behind it is conventional and detailed illustration and description thereof as well as the various skin panels mounted thereon or adjacent thereto need not be shown in detail. It is assumed for the purpose of this invention that the above structure, including the bulkhead 18, is sufficiently strong to withstand a front end collision of approximately 30 mph or whatever speed meets manufacturers specifications and government requirements without extensive and permanent destruction thereto provided, of course, that the force of the collision is properly absorbed by the bumper and other structure in front of it.

In the form of the invention here shown, the front end structure comprising the present invention is mounted directly cantilever-fashion on and supported by the bulkhead 18. However, it will be readily appreciated that, in a different vehicle construction such as one where the body is mounted on a heavy supporting frame, the front end structure of this invention might well be mounted on something other than a bulkhead of the type here shown. In any event, whatever the kind and type of vehicle involved, it will have structural supporting members that form, or that can be readily devised to provide, a suitable mounting structure similar or equivalent to the bulkhead mounting here shown by way of example.

It is contemplated that the front end structure of this invention have a lightweight supporting frame 20 disposed forwardly of and carried by the bulkhead 18, a bumper assembly 22 in front of and carried by the frame 20, and an air-bag 24 in and carried by the frame 20.

The bumper assembly 22 here shown comprises an essentially strong, generally rectangular metal backing plate 26 having a forwardly extending peripheral flange 28 and a generally rectangular bumper frame member 30 of flexible and resilient elastomeric material such as polyurethane which is bonded or otherwise attached to the plate. In practice, the backing plate 26 provides a rigid support for the bumper frame member 30 and the flange 28 is embedded in the rear portion of the latter to assure a secure union therebetween. The flange 28 stiffens and strengthens the backing plate 26 and the extent to which it penetrates the bumper frame member maximizes the bonding surface between the backing plate and the frame member. Manifestly, particularly in the latter connection, the flange 28 may have any desired form or configuration that will most effectively assure a secure and permanent bond between the backing plate 26 and the material from which the bumper frame 30 is made. It is of course desirable that the bumper frame member 30 extend a substantial distance forwardly of the backing plate 26 and that it have substantial bulk or mass in order to absorb essentially light impact forces to which the front bumpers of automotive vehicles ordinarily are or may be subjected to everyday use. A pair of shock absorbers 40 and 42 connect the backing plate 26 to the supporting frame 20. These shock absorbers are of a conventional type and they may be either spring or hydraulically loaded. Two laterally spaced shock absorbers are here shown behind and attached at the forward ends thereof substantially equidistantly from the ends of the plate 26. The rearward ends of the shock absorbers 40 and 42 are connected in any suitable or conventional way to the supporting frame 20.

The particular bumper frame member 30 here shown is of generally rectangular configuration and is of approximately the same size as but slightly larger than the backing plate 26 so that the peripheral flange 28 is imbedded in the frame member 30 substantially medianly thereof. The inner and outer sides 32 and 34 of the frame member 30 are forwardly convergent and terminate in a relatively narrow flat peripheral front surface 36. The rear portion of the frame member 30 preferably extends a substantial distance behind the backing plate 26, as at 38. Thus, by reason of its forwardly tapered configuration the portion of the frame member 30 disposed in front of the backing plate 26 provides progressively increased resistance to impact forces directed rearwardly thereagainst. In practice, it is contemplated that the soft forward portion of the bumper frame member 30 alone absorb very light impact forces and that heavier but still relatively light impact forces be taken by the shock absorbers 40 and 42. Thus, the soft front of the frame member 30 and the shock absorbers 40 and 42 collectively absorb relatively light impact forces normally encountered in non-collision type situations or accidents and that such relatively light impact forces be absorbed without effect on the supporting frame 20 or other adjacent parts of the vehicle. Specifically, it is contemplated that the bumper assembly 22 be capable of withstanding an impact force in the order of 5 mph without damage to itself or to the vehicle of which it is a part.

The supporting frame 20 on which the bumper assembly 22 is mounted is specially designed and constructed to be light in weight and at the same time to have the capability of withstanding impact forces within the range the bumper assembly 22 is adapted to handle but adapted further to begin to crush and collapse rearwardly under impact forces of a magnitude sufficiently large to overwhelm the bumper assembly 22 but not sufficient to cause significant permanent damage to the bulkhead 18 or other mounting structure to which the supporting frame 20 is attached.

It is contemplated that the supporting frame 20 be any suitable lightweight material such as a magnesium or aluminum alloy. It may be either cast or fabricated. In the particular form of the invention here shown by way of illustration, the frame 20 is of formed sheet metal construction, but it is contemplated as well that it be a fabricated construction; viz., that it be made up of individual members suitably interconnected as by bolts or rivets or by welding.

In any event, the particular frame 20 here shown has generally rectangular rear and front walls 44 and 46 interconnected by integral end walls 48 and top and bottom walls 50 and 52. Only one end wall 48 is here shown, but it will be readily apparent that a similar wall is provided at the opposite or near end of the frame as shown in FIG. 1, for example. It is contemplated also that the front wall 46 be solid or without openings to provide a firm, rigid supporting member for the bumper assembly 22 as well as for other purposes that will be hereinafter apparent. On the other hand, the rear wall 44, the end walls 48, and the top wall 50 have relatively large central openings 54, and the bottom wall 52 is formed with louvers 56 through which atmospheric air enters the supporting frame 20 when the vehicle is in motion.

The radiator 58 which is a conventional part of the vehicle may be mounted at either side of the bulkhead 18, but it is here shown mounted inside the supporting frame 20 attached to the rear wall 44 by suitable straps 60. As shown in FIG. 1, the radiator 58 is mounted directly over the opening 54 in the rear wall 44 so that atmospheric air entering the supporting frame 20 through the louvers 56 and possibly also the end openings 54 can pass through the radiator and the aligned rear opening 54 into the engine compartment 12 to cool the engine 10. In this connection, if necessary or desirable, the amount of air entering the supporting frame 20 through the louvers 56 can be augmented in any suitable or conventional way as by an air scoop (not shown) suspended below the frame.

It is desirable that the supporting frame 20 be detachably fastened to the bulkhead 18 and to this end the connection therebetween is here shown in the form of screws or studs 62 and nuts 64. Only two screws and nuts 62 and 64 are here shown at the left of the radiator 58, but it will be readily appreciated that similar bolt-and-nut connections are provided at the right of the radiator that is shown broken away in the drawing.

The connections between the rear ends of the shock absorbers 40 and 42 and the front wall 46 of the supporting frame 20 have been previously described and are here shown as fixed connections, but it is contemplated that these connections may be detachable so as to permit the bumper assembly to be removed from the frame if desired.

Typically, the supporting frame 20 will begin to crush and to collapse rearwardly under an impact force somewhat in excess of 5 mph; and it is contemplated that the frame, by itself, be capable of being fully collapsed under an impact force considerably less than the force at which the bulkhead 18 will begin to destruct.

In order to permit the bumper assembly 22 to absorb the full impact force for which it is designed, the shock absorbers 40 and 42, when fully extended, support the backing plate 26 spaced substantially forward of the supporting frame 20 so that the shock absorbers can bottom out under the full impact force that the bumper assembly is designed to withstand without physical engagement of the bumper assembly with the frame.

In order to strengthen the supporting frame 20 to make it more rigid so that it is capable of withstanding a maximum impact force less than the impact force at which the bulkhead 18 and other adjacent members of the vehicle body begin to destruct without adding excessive weight to the front end structure of the vehicle, the air-bag 24 mounted within the frame is adapted to explode under an impact force preferably greater than the impact force at which the frame begins to crush but less than the impact force at which the bulkhead and adjacent members of the vehicle begin to sustain permanent damage. A collision or impact force of from 10–20 mph is typically of the impact force contemplated to explode the air-bag 24. In the exploded condition, the air-bag 24 of course completely fills the supporting frame 20 and, in this condition, it provides increased resistance to further crushing and collapse of the frame so that impact forces against the bumper 22 of sufficient magnitude to overwhelm the bumper assembly are not transmitted directly to the bulkhead 18 until after the joint resistance afforded by the crushable frame 20 and the exploded air-bag 24 also are overwhelmed since most impact forces of the magnitude last referred to are not sustained but are momentary as in the case of a front end collision, for example. The walls of the supporting frame 20 confine the exploded air-bag 24 and retain it within the confines of the frame. To this end, if necessary or desirable, the relatively large openings 54 here shown may be made small enough so that there is not tendency for the bag to extrude through the holes or alternatively the large holes shown by way of illustration in the drawing, may be replaced by a plurality of smaller holes or they may be covered by an essentially strong coarse screen material (not shown). The combined resistance to collision forces provided by the bumper assembly 22 and the joint resistance effect of the crushable supporting frame 20 and the exploded air-bag 24 will, in many instances, prevent permanent destruction of the mounting bulkhead 18 and adjacent members of the vehicle body under conditions where direct application of the collision forces against the bulkhead would cause permanent damage or even destruction thereof and perhaps to the engine 10 as well. Manifestly, in collision situations of this type where there is no destruction or permanent damage to the bulkhead 18 or to portions of the vehicle behind the bulkhead, the destructive effect of the collision can be remedied simply by detaching the supporting frame 20 from the bulkhead 18 and replacing it with a new support frame and bumper assembly 22 which are relatively inexpensive. It will be apparent also that the destructable front end portion of the vehicle can be replaced easily and expeditiously and without necessity of removing adjacent portions of the vehicle body.

While it will be apparent that the invention herein described is well calculated to achieve the benefits and advantages as hereinabove set forth, it will be appreciated that the invention is susceptible to modification, variation and change without departing from the spirit thereof.

Having thus described the invention, we claim:

1. In an automotive vehicle,
a front bumper;
yieldable means associated with said bumper for resisting rearward movement thereof;
a normally folded, explodable air-bag behind said bumper; and
supporting frame means carrying said air-bag and adapted to confine the same in the exploded condition,
said yieldable means adapted to permit but actively resist rearward movement of said bumper under a relatively light, rearwardly directed impact force,
said supporting frame means adapted to collapse under a relatively heavy, rearwardly directed impact force which is less than an impact force capable of significantly damaging or destructing other major parts of the vehicle, and said air-bag adapted to explode under an impact force greater than said relatively light impact force and adapted further in the exploded condition to resist collapse of said supporting frame means.

2. An automotive vehicle according to claim 1 including
a bulkhead structure behind and supporting said supporting frame means, said bulkhead structure providing a rigid back-up support for said supporting frame means and being sufficiently strong so as not to collapse or destruct under a relatively heavy impact force sufficient to explode said air-bag and at least initiate collapse said supporting frame means.

3. An automotive vehicle according to claim 2 including
a radiator connected to and supported by said bulkhead; and
air flow means normally permitting flow of cooling atmospheric air into said supporting frame means and thence rearwardly through said radiator and said bulkhead.

4. An automotive vehicle according to claim 3 wherein
said supporting frame means is of generally box-like configuration, and wherein
said radiator is disposed within said box-like supporting frame means and is connected to said bulkhead indirectly through said supporting frame means.

5. An automotive vehicle according to claim 4 wherein
said bulkhead is part of the main body structure of said vehicle, wherein
said box-like supporting frame means includes a rear wall connected to and supported by said bulkhead, wherein
said radiator is disposed within said box-like supporting frame means and is mounted directly on the rearward wall thereof, and wherein
said air flow means includes air inlet means in said supporting frame means, and air outlet means behind said radiator in said bulkhead and the rear wall of said supporting frame means.

6. An automotive vehicle according to claim 1 wherein
said bumper has a forwardly facing portion of elastomeric material for initially absorbing said relatively light impact forces.

7. An automotive vehicle according to claim 1 wherein
said front bumper is provided with a forward portion of elastomeric material for initially absorbing said relatively light impact forces, and wherein
said yieldable means comprises shock absorber means interposed between and connected to said front bumper and to said supporting frame means for absorbing impact forces greater than said relatively light impact forces.

8. In combination with an automotive vehicle of the type having an essentially strong, rigid mounting structure adjacent one end thereof,
a lightweight supporting frame connected at one end thereof to said mounting structure;
bumper means connected to the other end of said supporting frame;
a normally folded, explodable air-bag carried by said supporting frame; and
air-bag confining means associated with said supporting frame for containing said air-bag in the exploded condition,
said bumper means adapted to yield and to absorb initial, relatively light impact forces without effect on said supporting frame and said mounting structure,
said supporting frame adapted to crush and to collapse in the direction of said mounting structure under impact forces greater than said relatively light impact forces but less than an impact force sufficient to destruct said mounting structure,
said air-bag adapted to explode under an impact force greater than said relatively light impact forces but less than the impact force required to fully collapse said supporting frame and at which said mounting structure begins to destruct, and
in the exploded condition said air-bag being cooperative with said air-bag confining means to absorb impact forces causing crushing and collapse of said supporting frame, and said air-bag being rendered operative after explosion thereof by progressive further collapsing of said supporting frame to augment resistance by the latter to destruction of said support means.

9. The combination as set forth in claim 8 including means for detachably fastening said supporting frame to said mounting structure.

10. The combination as set forth in claim 8 wherein said supporting frame and said bumper means are cantilevered from said mounting structure and extend therefrom longitudinally of the vehicle.

11. The combination as set forth in claim 10 wherein said supporting frame has front and rear impact sustaining members one of which is detachably fastened to said mounting structure and the other of which is connected to said bumper means.

12. The combination as set forth in claim 11 wherein said air-bag confining means includes means for holding the exploded air-bag so that it is engageable simultaneously with said front and rear impact sustaining members.

13. The combination as set forth in claim 8 wherein said automotive vehicle is of the type further having an engine compartment and front quarter inner panels at opposite sides of said engine compartment, and
  a front bulkhead interconnecting said inner panels at the forward end of said engine compartment,
  wherein said supporting frame is detachably fastened to said bulkhead and includes a front mounting member, and
  wherein said bumper means includes shock absorbers disposed at the rear thereof and fastened to the front mounting element of said supporting frame.

14. The combination as set forth in claim 13 wherein said automotive vehicle is of the type further having a radiator at the forward end of said engine compartment, and
  wherein said supporting frame is provided with air inlet means through which atmospheric air enters said frame and air outlet means in-line and communicating with said radiator through which atmospheric air passes from said supporting frame to and through said radiator.

15. The combination as set forth in claim 13 wherein the front portion of said bumper means is of a yieldable and resilient elastomeric material.

16. The combination as set forth in claim 15 wherein said elastomeric material and said shock absorbers are jointly operable to sustain an impact force in the order of 5 mph.

17. The combination as set forth in claim 16 wherein said bumper means, said crushable and collapsible supporting frame and said explodable air-bag are mutually cooperable to sustain an impact force in the order of 35 mph before significant destruction of said mounting structure occurs.

18. The combination as set forth in claim 16 wherein said air-bag is adapted to explode under a collision impact of from 10-20 mph.

19. In an automotive vehicle of the type having a fixed, rigid mounting structure at the front end thereof,
  lightweight supporting frame means mounted on and disposed forwardly of said mounting structure;
  a bumper ahead of and spaced from said supporting frame means;
  shock absorber means interconnecting said bumper and said supporting frame means holding the same normally in spaced apart relation,
  said shock absorber means being adapted to yieldingly resist rearward movement of said bumper into the space between the bumper and said supporting frame means under a relatively light, rearwardly directed impact force and said supporting frame means adapted to collapse under a relatively high rearwardly directed impact force greater than said relatively light impact force but less than an impact force required to damage the mounting structure on which said supporting frame means is mounted; and
  a normally folded air-bag disposed between said mounted structure and said bumper adapted to explode when the latter is subjected to a rearwardly directed impact force greater than said relatively light impact force,
  said supporting frame means including means for confining said air-bag in the exploded condition, whereby said air-bag and said supporting frame means mutually cooperate to resist collapse of said supporting frame means when the latter is subjected to said relatively high impact force.

20. An automotive vehicle according to claim 19 wherein said mounting structure is part of the vehicle body.

* * * * *